United States Patent Office 3,530,098
Patented Sept. 22, 1970

3,530,098
PROCESS FOR PREPARING LINEAR POLYESTERS USING BORON - CONTAINING MIXED ANHYDRIDES AS CATALYSTS
Peter Schweizer, Konigsbrunn, near Augsburg, Germany, assignor to Farbwerke Hoechst Aktiengesellschaft vormals Meister Lucius & Bruning, Frankfurt am Main, Germany, a corporation of Germany
No Drawing. Filed July 26, 1967, Ser. No. 656,072
Claims priority, application Germany, Aug. 16, 1966, F 49,952
Int. Cl. C08q 17/015
U.S. Cl. 260—75   3 Claims

ABSTRACT OF THE DISCLOSURE

A process for preparing linear, fibre- and film-forming polyesters by polycondensing indicated dicarboxylic acid bis-diol esters in the presence of mixed anhydrides of indicated boron acids with organic acids or in the presence of adducts of these mixed anhydrides with compounds containing donator atoms as polycondensation catalysts.

---

The present invention provides a process for preparing linear polyesters.

It is known that linear fibre- and film-forming polyesters can be prepared by polycondensation of organic dicarboxylic acid bis-diol esters. The catalysts used for this polycondensation are, above all, metal oxides, for example the oxides of antimony, lead and tin. The use of these catalysts, however, involves the drawback that the finished polyester products are, in many cases, highly discoloured. This discolouration can be weakened by adding certain phosphorus compounds, especially phosphorous acid or triphenyl-phosphite, but, in many cases, these phosphorus compounds reduce the metal oxide catalysts to elementary metals. These metals then separate in the condensation melt in a finely divided form and provide the polyester with an undesired grey tint.

Polyesters which are only slightly discoloured, are obtained using as polycondensation catalysts compounds of rare earths, for example neodymium, lanthanum or cerium. Said compounds of rare earths are, however, rather difficult to obtain and raise the costs of the whole polycondensation process, owing to their high prices.

It is, finally, known to those skilled in the art that polyesters which are not discoloured, can be obtained using boron compounds as polycondensation catalysts. As such boron compounds there are known boron trioxide, boric acid, calcium borates, zinc borate, lead borate, manganese borate, cobalt borate, boron tungstates and further borates, salts and oxides of elements of Group III of the Periodic Table, boron glycolate, boranes, alkali metal boranates and alkali metal tetra-alkoxy-borates.

These compounds, however, are either scarcely soluble in the polycondensation melt and therefore little active (borates) or too volatile (boranes). Furthermore, the resulting polycondensates turn yellow very easily.

We have now found that linear fibre- and film-forming polyesters can be prepared by polycondensing dicarboxylic acid bis-diol esters of aromatic dicarboxylic acids having 1 or 2 aromatic rings, if desired, in admixture with up to 20% by mol of aliphatic and/or cycloaliphatic dicarboxylic acids having from 6 to 10 carbon atoms, with aliphatic and/or cycloaliphatic diols having from 2 to 8 carbon atoms. Such reaction proceeds in the presence of catalysts consisting of mixed anhydrides of the orthoboric acid or a condensed boric acid, a mono-alkyl-boric acid or di-alkyl-boric acid, a mono-aryl boric acid or a di-aryl-boric acid, a mono-alkyloxy-boric acid or di-alkyloxy-boric acid, a mono-aryloxy-boric acid or di-aryloxy-boric acid, or the free or neutralized tetrahydroxo-boric acid with aliphatic or aromatic mono- or di-carboxylic acids having up to 18 carbon atoms having free phenolic OH-groups capable of being condensed with the corresponding boric acid.

A concentration of from 0.01 to 0.07% by mol, calculated on the amount of the dicarboxylic acid bis-diol ester is found useful in effecting the above reaction. It is further noted that the mixed anhydrides of the two above-mentioned components, which serve as polycondensation catalysts, may also be used as adducts with compounds containing donator atoms.

The dicarboxylic acid bis-diol esters used as starting substances for the polycondensation, are prepared in known manner from the esters of the dicarboxylic acids with lower alcohols, preferably methanol, causing an ester-interchange reaction between the dicarboxylic acid esters and the desired diols.

In this process, the lower alcohol is continuously distilled off from the equilibrium while raising the temperature. Preferred ester-interchange catalysts are acetates of zinc, cobalt or manganese; also useful are the zinc salts, cobalt salts and manganese salts of bis-salicylato-boric acids. The use of these three compounds as ester-interchange catalysts involves the advantage that, after the ester-interchange reaction, said compounds can be immediately used for the polycondensation without an addition of further catalysts since these three compounds also act as polycondensation catalysts according to the invention.

The dicarboxylic acid bis-diol esters to be polycondensed according to the invention, are derived from aromatic dicarboxylic acids preferably containing 1 or 2 aromatic rings in the molecule, if desired in admixture with up to 20% by mol of aliphatic and/or cycloaliphatic dicarboxylic acids preferably containing from 6 to 10 carbon atoms in the molecule. As aromatic dicarboxylic acids there are suitable, for example, isophthalic acid, 2.6-naphthalene-dicarboxylic acid, 4.4'-diphenyl-dicarboxylic acid, sulfonyl-di-benzoic acid and, preferably, terephthalic acid. As aliphatic dicarboxylic acids there are mentioned, for example, adipic acid, pimelic acid, sebacic acid, hexahydroterephthalic acid and 1.2-cyclobutane-dicarboxylic acid.

As diol components of the dicarboxylic acid bis-diol esters there are, preferably, useful aliphatic and/or cycloaliphatic diols containing from 2 to 8 carbon atoms, for example trimethylene glycol, tetramethylene glycol, 2.2-dimethyl-propane-diol - 1.3, 1.2 - dimethylol - cyclobutane, 1,4-dimethylol-cyclohexane and, especially, ethylene glycol. The dicarboxylic acids and the diols may also be substituted, for example, by the methoxyl group, ethoxyl group, sulfonyl group or an alkali metal sulfonate group, as far as they do not cause any trouble in the polycondensation.

As catalysts suitable for the polycondensation of the dicarboxylic acid bis-diol esters there are used the following boron-containing compounds according to the invention:

(a) Mixed anhydrides of ortho-boric acid $H_3BO_3$ or a condensed boric acid, for example of the series $H_4B_2O_5 \ldots (HBO_2)_n$ and one or several aliphatic or aromatic mono- or di-carboxylic acids having up to 18 carbon atoms and still containing phenolic OH-groups capable of being condensed with the corresponding boric acid. The following examples of these compounds include only carboxylic acid components which do not have condensable phenolic OH-groups:

tris-(trichloracetato)-borate $B(OCOCCl_3)_3$
tris-(trifluoracetato)-borate $B(OCOCF_3)_3$
tris-propionic acid borate $B(OCOCH_2—CH_3)_3$
tris-n-butyric acid borate $B(OCOCH_2—CH_2—CH_3)_3$

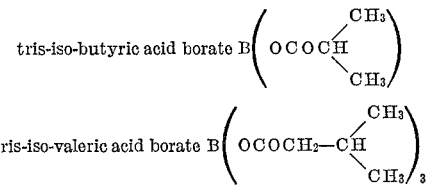

tris-n-capronic acid borate $$B(OCOCH_2—CH_2—CH_2—CH_2—CH_3)_3$$

tris-stearic acid borate $B[OCO(CH_2)_{16}—CH_3]_3$
tris-benzoato-borate $B(OCOC_6H_5)_3$
tris-p-tolylic acid borate $B(OCOC_6H_4—CH_3—p)_3$
succinic acid borate $(C_4H_4O_4)_3B_2$
phthalic acid borate $(C_6H_4C_2O_4)_3B_2$
tetraacetato-diborate $OB_2(OCOCH_3)_4$
tetra-trifluoracetato-diborate $OB_2(OCOCF_3)_4$
acetatometaborate $(OBOCOCH_3)_n$ These compounds may also be used in the form of adducts with compounds containing donator atoms, such as O, S, N, for example dimethyl amine. Examples of these adducts are the dimethyl-amine-tris-acetato-borate adduct $(CH_3)_2HN\rightarrow B(OCOCH_3)_3$ and the dimethyl-amine-tris-benzoato-borate adduct $$(CH_3)_2HN\rightarrow B(OCOC_6H_5)_3$$

(b) Mixed anhydrides of a mono-alkyl-boric acid, di-alkyl-boric acid, mono-aryl-boric acid, di-aryl-boric acid, mono-alkyloxy-boric acid, di-alkyloxy-boric acid, mono-aryloxy-boric acid or di-aryloxy-boric acid and one or several aliphatic or aromatic mono- or dicarboxylic acids having up to 18 carbon atoms, for example ethyl-boric acid diacetate $(C_2H_5)B(OCOCH_3)_2$
diethylboric acid acetate $(C_2H_5)_2B(OCOCH_3)$
diphenyl-boric acid acetate $(C_6H_5)_2B(OCOCH_3)$
1-hydroxy-anthraquinonyl-boron diacetate

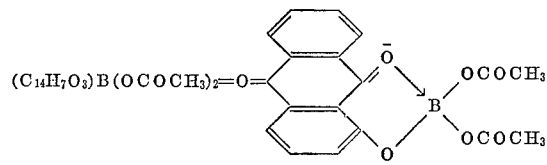

8-hydroxy-quinolinyl-boron diacetate

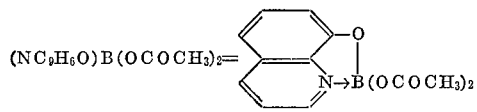

In this case, too, the carboxylic acid components may, of course, still contain phenolic OH-groups capable of being condensed with the corresponding boric acid. Said phenolic OH-groups may, however, also be derived from separate compounds such, for example, as to be seen from the last two examples mentioned above, i.e. 1-hydroxy-anthraquinonyl-boron diacetate and 8-hydroxy-quinolinyl-boron diacetate. The compound types mentioned under (b) may also be used in the form of adducts with compounds containing donator atoms, such as O, S, N, whereby the boron also has 4 bonds in this case. 1-hydroxy-anthraquinonyl-boron diacetate and 8-hydroxy-anthraquinolinyl-boron diacetate are adducts of this type.

(c) Mixed anhydrides of the free or neutralized tetra-hydroxoboric acid $HB(OH)_4$ with aliphatic or aromatic mono- or di-carboxylic acids having up to 18 carbon atoms and still containing phenolic OH-groups capable of being condensed, for example bis-oxalato boric acid $H[B(C_2O_4)_2]$
bis-phthalato boric acid $H[B(C_6H_4C_2O_4)_2]$
bis-salicylato boric acid $H[B(OC_6H_4COO)_2]$
salicylato boric acid $H[B(OH)_2(OC_6H_4—COO)]$ as well as the alkali metal salts, such as lithium, sodium, potassium, rubidium, cesium; alkaline earth metal salts, such as beryllium, magnesium, calcium, strontium and barium; ammonium salts, pyridinium salts, zinc salts, cadmium salts, cobalt salts, nickel salts, manganese salts of these acids, for example $$Co[B(OC_6H_4COO)_2]_2$$
$$Zn(Mn)[B(OC_6H_4COO)_2]_2$$

All the compounds mentioned under (c) already possess boron with 4 bonds, and therefore cannot form any more adducts with compounds containing donator atoms.

The boron compounds to be used as catalysts according to the present invention, may be prepared in different ways, for example, by (a) splitting off water from the corresponding mixture of boric acid and carboxylic acid,
(b) reacting boron halides as well as alkyl boranes, aryl boranes, alkyloxy-boranes and aryloxy-boranes with carboxylic acids,
(c) replacing lower carboxylic acids in the molecule by higher ones.

The catalysts of the invention are added to the reaction mixture in amounts in the range of from 0.01 to 0.07% by mol, calculated on the amount of dicarboxylic acid bis-diol ester used. For achieving the optimum colour quality of the finished polyester, it is advantageous, in many cases, also to add from 0.005 to 0.02% by mol, likewise calculated on the amount of the dicarboxylic acid bis-diol ester used, of phosphorous acid or triphenyl-phosphite.

It is also possible to add optical brighteners or delustering agents. The polycondensation is carried out in known manner, while slowly raising the temperature of the polycondensation melt to about 275° C. under exclusion of air and under atmospheric pressure. The pressure is, then, suitably reduced, while maintaining the temperature, to less than 1 millimetre of mercury and the melt is maintained under these conditions for 2 to 4 hours. When the reaction is complete, the melt is discharged into cold water and then reduced to small pieces.

When zinc acetate is used as an ester-interchange catalyst for preparing the dicarboxylic acid bis-diol esters, the polyesters obtained according to the invention are completely colourless and transparent; when cobalt acetate is used, they have a slightly bluish tint, but they also are transparent. The bluish tint obtained in this case is desirable since the fibres prepared from this condensate are distinguished by an especially high degree of white. When manganese acetate is used for the ester-interchange reaction, the polyesters obtained are transparent, but they are only entirely coulourless when small amounts of phosphorous acid or triphenyl-phosphite have been added to the condensation melt. When the catalysts of the invention are used, it is completely impossible that the polyesters turn grey, as is the case when antimony compounds are used as polycondensation catalysts. The relative viscosities to be achieved amount to about 2.0. The melting points of the condensates correspond to those prepared in the presence of different catalysts.

The polyesters prepared according to the invention, especially polyethylene-terephthalate, can be processed in an unobjectionable manner, for example by means of extruders or grid spinnerets, into drawable filaments or into films and threads. The thermal degradation occurring during the processing is very reduced. The degree of white of the finished products obtained is excellent and very superior to usual products prepared with antimony or antimony compounds as polycondensation catalysts. It is especially advantageous to use the novel catalysts of the invention for continuously preparing polyesters. As regards the other properties, such as tensile strength, etc., the finished products are up to usual standards.

It is a particular advantage of the present invention over processes of the prior art which already use boron-containing polycondensation catalysts, that the catalysts of the invention are easily soluble in the polycondensation melt and are hardly volatile and that the polycondensates hardly turn yellow.

The following examples serve to illustrate the invention but they are not intended to limit it thereto. The relative viscosities were measured in 1% by-weight-solutions of the polymers in phenol tetrachloroethane=3:2 at 25° C.

EXAMPLE 1

A mixture of 1,200 grams of dimethyl-terephthalate, 880 grams of ethylene glycol and 0.240 gram of zinc acetate was heated from 180 to 220° C. within 4 hours, under a nitrogen atmosphere, with methanol being distilled off. 1.20 grams of tris-benzoato-borate and 0.024 gram of phosphorous acid were then added to the melt which was heated to 275° C., while stirring, and then the pressure was reduced to less than 1 millimetre of mercury. After the melt had been maintained for 3.5 hours under these conditions with the pressure decreasing to about 0.4 millimetre of mercury, the rising current input of the stirring motor showed a considerable increase in the melt viscosity. The melt was then discharged into cold water. There was obtained a transparent colourless condensate having a relative viscosity of 1.898 and a melting point of 257° C. At 287° C., the product could unobjectionably be spun into filaments which were drawn in a ratio of 1:4.2 and which possessed a high strength. Their relative viscosity was 1.852; their colour quality was very good. The products did not turn yellow or grey.

When 0.360 gram of cobalt acetate or 0.276 gram of manganese acetate were used as ester-interchange catalysts for the ester-interchange reaction between dimethyl-terephthalate and ethylene glycol instead of zinc acetate, the condensation proceeded in the manner disclosed above.

EXAMPLE 2

In a manner analogous to the process disclosed in Example 1, 1,200 grams of dimethyl-terephthalate were subjected to an ester-interchange reaction with 880 grams of ethylene glycol in the presence of 0.360 gram of cobalt acetate instead of zinc acetate as an ester-interchange catalyst. Subsequently, 0.960 gram of tetra-acetato-diborate was added thereto and the whole was condensed, while stirring, at 275° C. and under a pressure in the range of from 1 to 0.5 millimetre of mercury in the manner disclosed in Example 1. After having been maintained for 2 hours under these conditions, the melt was discharged into cold water. It solidified to yield a transparent mass which, in a thick layer, had a slightly bluish tint. The relative viscosity of the polycondensate was 1.920, the melting point was 257° C. After having been drawn in a ratio of 1:4.3, the filaments spun from the product had a high strength and a white of a particularly great luminance. The addition of phosphorous acid or triphenyl-phosphite to the polycondensation melt considerably reduced the bluish tint of the condensate.

EXAMPLE 3

After the ester-interchange reaction of 1,200 grams of dimethyl-terephthalate with 880 grams of ethylene glycol and 0.240 gram of zinc acetate as a catalyst, in the manner disclosed in Example 1, 1.20 grams of bis-salicylato-boric acid were added to the melt and the whole was condensed for 2.5 hours in the manner disclosed in Example 1. The polyester obtained was transparent and colourless, it had a relative viscosity of 1.894 and a melting point of 254° C. As to its other properties, it corresponded to the product disclosed in Example 1 and could easily be spun into drawable filaments having a relative viscosity of 1.866.

EXAMPLE 4

Under a nitrogen atmosphere, 38.40 grams of dimethyl-terephthalate were subjected to an ester-interchange reaction within 4 hours, with 31.0 grams of ethylene glycol in the presence of 0.009 gram of manganese acetate with an increase in temperature of from 180° to 230° C. 1.6 grams of a product obtained by esterifying 32.0 grams of 1.2-cyclobutane-dicarboxylic acid dimethyl ester (isomer mixture of about 75% of trans-1.2-cyclobutane-dicarboxylic acid dimethyl ester and 25% of cis-1.2-cyclobutane-dicarboxylic acid dimethyl ester, having a boiling point under a pressure of 12 millimetres of mercury, of 105° C.) with 28.90 grams of ethylene glycol in the presence of 0.0074 gram of manganese acetate, were added thereto. 0.040 gram of tetra-acetato-diborate was also added thereto as a polycondensation catalyst. Within an hour, the temperature was raised to 278° C. and the pressure was reduced to 0.8 millimetre of mercury. After a period of 2 hours at this temperature with the pressure decreasing to 0.2 millimetre of mercury, the reaction was complete. The copolyester was transparent and colourless, it had a relative viscosity of 1.779 and a melting point of 243° C. Filaments spun from this product were easily drawable.

EXAMPLE 5

Under a nitrogen atmosphere, 40.0 grams of dimethyl-terephthalate and 1.6 grams of sebacic acid dimethyl ester were subjected to an ester-interchange reaction within 4 hours, with 32.0 grams of ethylene glycol in the presence of 0.0096 gram of manganese acetate with an increase in temperature of from 180° to 230° C. 0.04 gram of tetra-acetato-diborate was then added thereto, the melt was heated, within 1 hour, to 275° C. and the pressure was reduced to 0.5 millimetre of mercury. After 3.5 hours, the reaction was complete. The polyester obtained was transparent and colourless. (Relative viscosity=1.734, melting point=254° C.) Filaments spun from this copolyester were easily drawable.

EXAMPLE 6

In the manner disclosed in Example 1, 500 grams of dimethyl-terephthalate were subjected to an ester-interchange reaction with 400 grams of ethylene glycol in the presence of 0.10 gram of zinc acetate. After an addition of 0.50 gram of 8-hydroxy-quinolinyl-boron diacetate, the polycondensation was carried out in the manner disclosed in Example 1. The reaction period amounted to 5 hours. The polyester was transparent and had a slightly orange tint. It could be spun into easily drawable filaments. The relative viscosity of the product was 1.824, the melting point was 255° C.

EXAMPLE 7

48.8 grams of 2.6-naphthalene-dicarboxylic acid dimethyl ester and 31.0 grams of ethylene glycol were slowly heated with 0.0146 gram of manganese acetate from 180° to 230° C. and then maintained at this temperature until the calculated amount of methanol had been distilled off. After 0.0488 gram of tetra-acetato-diborate had been added, the temperature of the melt was slowly raised to 275° C., while stirring, and the pressure was then reduced to values ranging from 0.5 to 0.18 millimetre of mercury. After a reaction time of 4 hours under these conditions, the transparent polyester was discharged into cold water. The product had a relative viscosity of 1.665, a melting point of 260° C. and it could be processed into easily drawable filaments.

EXAMPLE 8

In the manner disclosed in Example 1, 38.8 grams of dimethyl-terephthalate were subjected to an ester-interchange reaction with 31.0 grams of ethylene glycol in the presence of 0.0081 gram of manganese acetate. Subsequently, 1.63 grams of bis-(1.4-dimethylol-cyclohexane)-terephthalate were added thereto. As a catalyst for the polycondensation, 0.04 gram of bis-salicylato-boric acid was added to the melt and the whole was condensed for 3 hours at 275° C. and under a pressure of 0.26 millimetre of mercury. The transparent colourless product had a relative viscosity of 1.813 and a melting point of 248° C. Filaments spun therefrom were easily drawable. In this example, the commercial product of 1.4-dimethylol-cyclohexane, a cis/trans-isomer mixture having a boiling point, under a pressure of 0.6 millimetre of mercury, in the range of from 138° to 140° C., manufactured by "Eastman Chemical Products" was used.

EXAMPLE 9

Under a nitrogen atmosphere, 500 grams of dimethyl-terephthalate were subjected to an ester-interchange reaction within 5 hours, with 400 grams of ethylene glycol in the presence of 0.50 gram of cobalt-bis-salicylato-borate as a catalyst with an increase in temperature of from 200° to 230° C. After 0.01 gram of phosphorous acid had been added to the melt, the polycondensation was carried out without a further catalyst, after an excess of ethylene glycol had been distilled off at a bath temperature in the range of from 230 to 275° C. After a period of 5 hours and 45 minutes at 275° C. and under a pressure in the range of from 1.4 to 1.1 millimetres of mercury, the reaction was complete. The transparent colourless condensate which showed a slightly bluish tint, had a relatively viscosity of 1.804 and a melting point of 258° C. Extruded filaments were easily drawable and were distinguished by a very high degree of white.

EXAMPLE 10

In the manner disclosed in Example 9, 100 grams of dimethyl-terephthalate were subjected to an ester-interchange reaction with 77 grams of glycol in the presence of 0.03 gram of zinc-bis-salicylato-borate as a catalyst. After the excess of ethylene glycol had been distilled off, the polycondensation was carried out at 275° C. and under a pressure in the range of from 1 to 0.3 millimetre of mercury without adding a further catalyst or another additive. The melt which was discharged into cold water after 3.5 hours, was transparent and colourless, had a relative viscosity of 1.797 and a melting point of 258° C. Filaments obtained from the melt are easily drawable.

When manganese-bis-salicylato-borate was used instead of the zinc salt, the same results were obtained.

What is claimed is:

1. In a process for preparing linear fibre- and film-forming polyesters by polycondensing dicarboxylic acid bis-diol esters having dicarboxylic acid component consisting of
   (a) 100–80% by mol of an aromatic dicarboxylic acid selected from the group consisting of terephthalic acid, isophthalic acid, 2,6-naphthalene-dicarboxylic acid, 4,4'-diphenyldicarboxylic acid and sulfonyl-dibenzoic acid and
   (b) up to 20% by mol of an aliphatic dicarboxylic acid selected from the group consisting of adipic acid, pimelic acid, sebacic acid, hexahydro-terephthalic acid and 1,2-cyclobutanedicarboxylic acid, the diol component thereof consisting of a diol having 2–8 carbon atoms, in the presence of a catalyst; the improvement which comprises effecting the condensation reaction in the presence of a catalytic amount of boron-containing mixed acid anhydride polycondensation catalyst selected from the group consisting of
   tris-(trichloracetato)-borate,
   tris-(trifluoracetato)-borate,
   tris-propionic acid borate,
   tris-n-butyric acid borate,
   tris-iso-butyric acid borate,
   tris-iso-valeric acid borate,
   tris-n-capronic acid borate,
   tris-stearic acid borate,
   tris-benzoato-borate,
   tris-p-tolylic acid borate,
   succinic acid borate,
   phthalic acid borate,
   tetra-acetato-diborate,
   tetra-trifluoracetato-diborate,
   acetatometaborate,
   ethyl-boric acid diacetate,
   diethylboric acid acetate,
   diphenyl-boric acid acetate,
   1-hydroxy-anthraquinonyl-boron diacetate,
   8-hydroxy-quinolinyl-boron diacetate,
   bis-oxalato boric acid,
   bis-phthalato boric acid,
   bis-salicylato boric acid,
   salicylato boric acid,
   dimethyl-amino-trisacetato-borate,
   dimethyl-amino-tris-benzoato-borate,
   and the corresponding
      alkali metal salts,
      alkaline earth metal salts,
      ammonium salts,
      pyridinium salts,
      zinc salts,
      cadmium salts,
      cobalt salts,
      nickel salts, and
      manganese salts thereof.

2. In a process for preparing linear fibre- and film-forming polyesters by polycondensing bis-(β-hydroxyethyl)-terephthalate in the presence of catalysts, the improvement which comprises using as polycondensation catalysts boron-containing mixed acid anhydrides selected from the group consisting of
   tris-(trichloracetato)-borate,
   tris-(trifluoracetato)-borate,
   tris-propionic acid borate,
   tris-n-butyric acid borate,
   tris-iso-butyric acid borate,
   tris-iso-valeric acid borate,
   tris-n-capronic acid borate,
   tris-stearic acid borate,
   tris-benzoato-borate,
   tris-p-tolylic acid borate,
   succinic acid borate,
   phthalic acid borate,
   tetra-acetato-diborate,
   tetra-trifluoracetato-diborate,
   acetatometaborate,
   ethyl-boric acid diacetate,
   diethyl-boric acid acetate,
   diphenyl-boric acid acetate,
   1-hydroxy-anthraquinonyl-boron diacetate,
   8-hydroxy-quinolinyl-boron diacetate,
   bis-oxalato boric acid,
   bis-phthalato boric acid,
   bis-salicylato boric acid,
   salicylato boric acid,
   and the corresponding
      alkali metal salts,
      alkaline earth metal salts,
      ammonium salts,
      pyridinium salts,
      zinc salts,
      cadmium salts,
      cobalt salts,
      nickel salts, and
      manganese salts thereof.

3. In the process of claim 1, the improvement which comprises adding as a stabilizer, phosphorous acid or triphenyl phosphite in an amount of 0.005–0.02% by mol calculated on the dicarboxylic acid bis-diol ester.

References Cited

UNITED STATES PATENTS 3,113,125   12/1963   Grantham et al. _____ 260—75
3,391,123   7/1968   Steadly _____ 260—75

WILLIAM H. SHORT, Primary Examiner

L. P. QUAST, Assistant Examiner

U.S. Cl. X.R.

260—45.7, 270, 283, 369, 429.9, 439, 462